United States Patent [19]

Stage

[11] 3,903,711
[45] Sept. 9, 1975

[54] CONSTANT VELOCITY UNIVERSAL JOINT

[76] Inventor: Jack W. Stage, 100 Mt. Lyell Dr., San Rafael, Calif. 94903

[22] Filed: Apr. 8, 1974

[21] Appl. No.: 458,762

[52] U.S. Cl. ................................ 64/21; 64/7; 64/6
[51] Int. Cl. .................................... F16d 3/30
[58] Field of Search ............. 64/21, 8, 7, 17, 9, 23, 64/6; 403/58

[56] References Cited
UNITED STATES PATENTS

| | | | |
|---|---|---|---|
| 1,384,255 | 7/1921 | Hanson | 64/7 |
| 1,835,684 | 12/1931 | Williams | 64/7 |
| 2,207,980 | 7/1940 | Greiner | 64/21 |
| 3,392,548 | 7/1968 | Meyer | 64/21 |

Primary Examiner—Samuel Scott
Assistant Examiner—Randall Heald
Attorney, Agent, or Firm—Melvin R. Stidham, Esq.

[57] ABSTRACT

A constant velocity universal joint wherein the input and output shafts are connected by a ball and socket joint. A slide and slideway, each pivotally mounted on one of the shafts engage across the ball and socket joint to transmit torque from input to output shaft. The pivotal axis of each of said motion transmitting slide members is perpendicular to the shaft on which it is carried and said pivotal axes are equidistant from said ball and socket pivot center.

6 Claims, 16 Drawing Figures

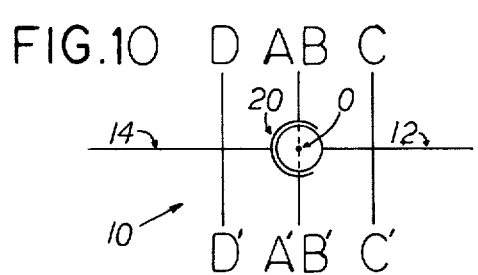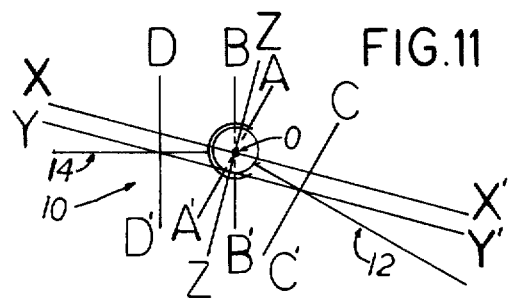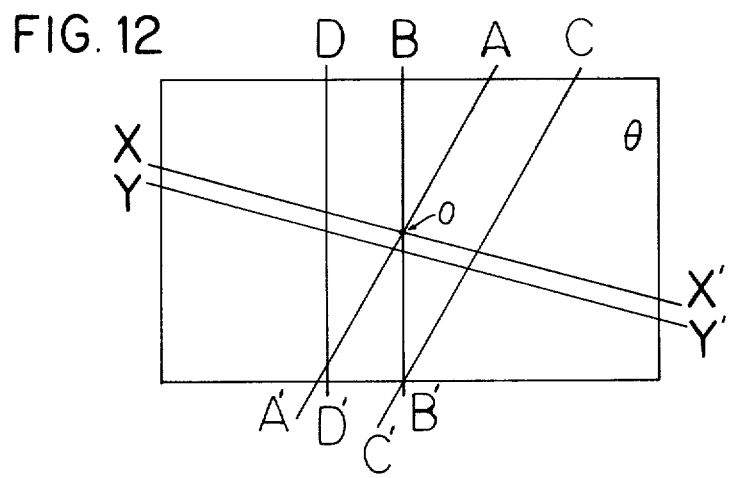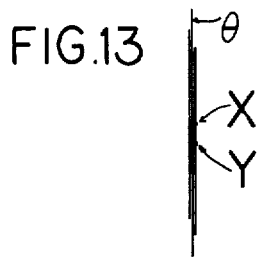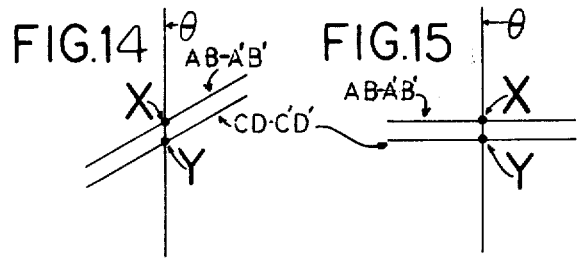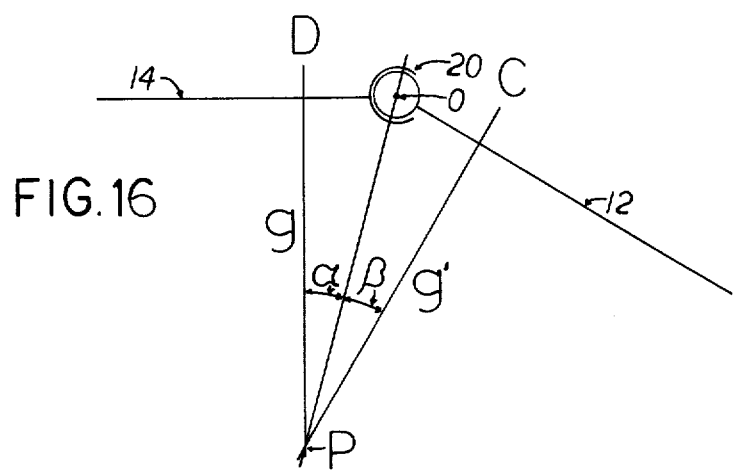

3,903,711

CONSTANT VELOCITY UNIVERSAL JOINT

BACKGROUND OF THE INVENTION

In certain known types of universal joints a plurality of balls are carried in aligned grooves in a ball and socket coupling whereby torque is transmitted through the balls so that the driving shaft and the driven shaft rotate at a uniform rotational speed. In such an arrangement, the balls are usually located so as to form a plane bisecting the angle between the two shafts. Such universal joints have been relatively successful but the spheroid elliptical machining required renders them rather expensive to manufacture. Moreover, the balls tend to bind in certain instances and often produce a cutting action to damage seriously the ball and socket joint.

OBJECTS OF THE INVENTION

It is an object of this invention to provide a constant velocity universal joint which is relatively simple and inexpensive to manufacture.

It is a further object of this invention to provide a constant velocity universal joint which produces minimal relative movement between components thereof during rotation.

Other objects and advantages of this invention will become apparent from the detailed description to follow, particularly when read in conjunction with the accompanying drawings.

BRIEF SUMMARY OF THE INVENTION

In carrying out this invention, I provide input and output shafts on one of which is carried a ball and on the other of which is carried a socket, the ball and socket being interengaged and there being sufficient contacting spherical surfaces to insure a constant center point. Pivotally carrried on the input and output shafts are torque transmitting slide plates, the pivotal axes of which form a common plane and are equidistant from the fixed center point of the ball and socket joint. One of the torque transmitting slide members may comprise a pair of parallel, rigid slide plates, with a complementary slide plate, which is pivoted on the other shaft, being slidably nested between them. Hence, rotation of the input shaft is transmitted through the nested plates to the output shaft and the sliding relationship of the pivotal plates accommodates the varying angular dispositions of the working shaft through 360° of rotation. In a preferred embodiment, one of the torque transmitting slide members is pivotally carried on the ball and the other slide member is pivotally carried in the socket whereby the pivotal axes are relatively close and the sliding movement between the members during rotation is minimal.

BRIEF DESCRIPTION OF THE DRAWINGS

In the drawings:

FIGS. 10 through 15 illustrate parallel planes of rotation experienced with the universal joint of this invention; and FIG. 16 is a schematic illustration of the motion transmitting forces of the universal joint.

DESCRIPTION OF THE PREFERRED EMBODIMENTS

Figure 1:
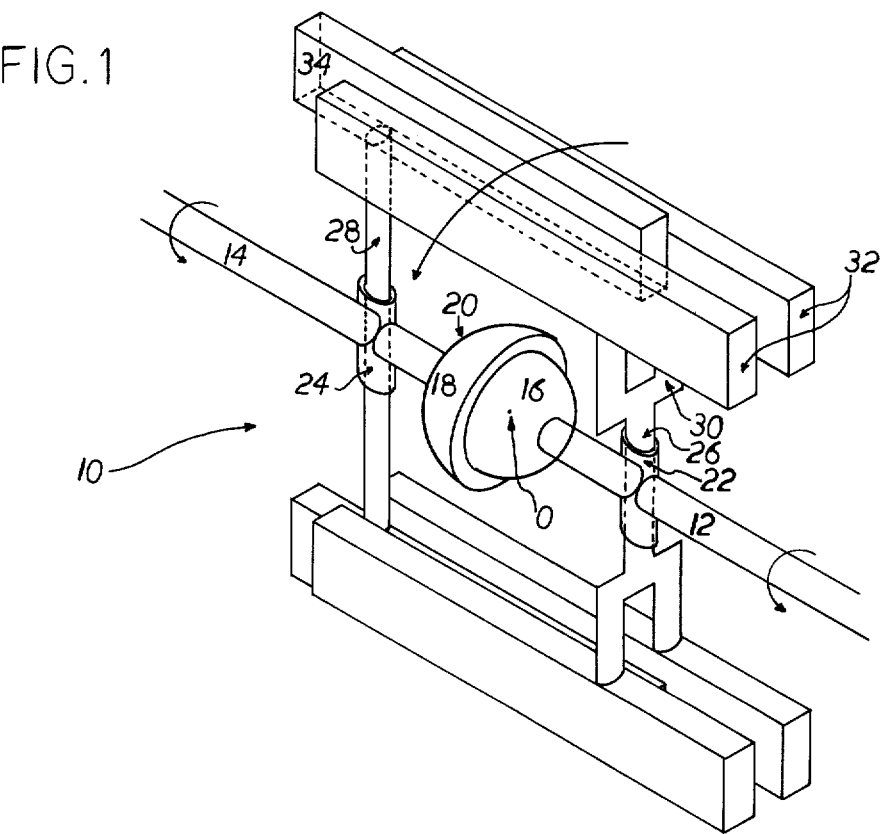
FIG. 1 is a schematic illustration of a constant speed universal joint embodying features of this invention.

The Embodiment of FIG. 1

Referring now to FIG. 1 with greater particularity, the universal joint 10 of this invention comprises an input or driving shaft 12 and an output or driven shaft 14, on each of which is carried a component 16 and 18 of a ball and socket coupling 20. It is to be understood that shaft 12 is termed the input shaft merely for purposes of illustration and that the two shafts may selectively function interchangeably. The socket 18 engages over sufficient surface of the ball 16 so that the two are firmly interengaged with a fixed center point O between them.

Carried on each of the shafts 12 and 14 at points equidistant from the fixed center point O are rotary bearing members 22 and 24, each rotatably carrying a working or motion transmitting shaft 26 and 28, respectively. Each of the working shafts 26 and 28 is disposed perpendicularly to that one of the input and output shafts 12 and 14 on which it is carried, and they form a common plane. As illustrated, the working shafts may extend on both sides of the input and output shafts, and if desired, the two working shaft segments may rotate in the bearings 22 and 24 separately. One of the working shafts 26 is bifurcated at 30, and rigidly fixed to the arms 30 thereof is a pair of spaced, torque transmitting plates 32. Fixed to the end of the other working shaft 28 is an output torque transmitting plate 34 slidably nested between the driving torque delivery plates 32.

Rotation of the input shaft 12 in the direction of the arrow is transmitted from the working shaft 26, 30 and paired driving slide plates 32, to the driven torque transmitting slide plate 34 and then through the output working shaft 28 to the driven shaft 14. Again, the terms input and output are used interchangeably here and the same result would obtain if the drive was from shaft 14 through the motion transmitting plates 34 and 32 to the shaft 12. Because of the ball and socket joint 20 this universal drive is effected though the shafts 12 and 14 may be disposed at an angle.

The Embodiment of FIGS. 2, 3, 5 and 6

Referring now to FIGS. 2, 3, 5 and 6 there is shown a practical embodiment 110 of my constant velocity universal joint. Elements corresponding to like elements in FIG. 1 are identified by the same reference numerals preceded by a hundreds digit. As there shown, the driving shaft 112 and the driven shaft 114 carry the ball 116 and the socket 118, respectively. The input working shaft 126 is rotatably carried directly on the ball 116 with its axis along the line 5—5 at the axis of driving shaft 112 and displaced a short distance from the center line C.L. of the ball. Integral with the input motion transmitting shaft 126, or in any event firmly fixed thereto, is the input torque transmitting slide plate 132. A bearing collar 127 may be provided on the shaft 126 and motion transmitting plate 132 to enable them to slide easily on the flat surface 116a of the truncated ball 116.

Figure 5:
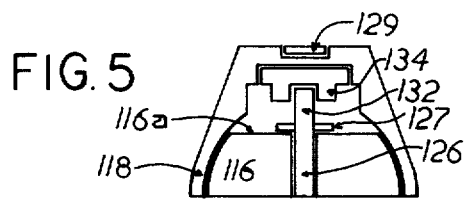
FIG. 5 is a section view taken along Line 5—5 of FIG. 2.
Figure 6:
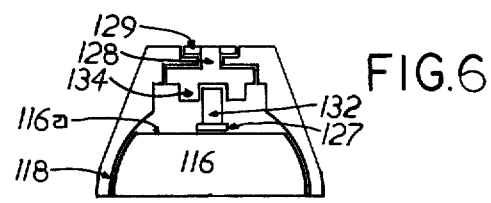
FIG. 6 is a section view taken along Line 6—6 of FIG. 2.

The output working shaft 128 is rotatably carried directly on the socket about an axis along the line 6—6, also closely displaced from the center line C.L. of the ball at the axis of the driven shaft 114, the pivotal shafts 126 and 128 being equidistant from the center line. A retaining key 129 holds the working shaft 128 on the socket 118 for rotation thereon, and carried thereon are the output torque transmitting slide plates 134 which slidably embrace the input torque transmitting slide plate 132 (FIGS. 5 and 6). A recess 136 in the socket member of the universal joint allows motion of the slide plate 132 within the physical limits of the joint.

Figure 4:
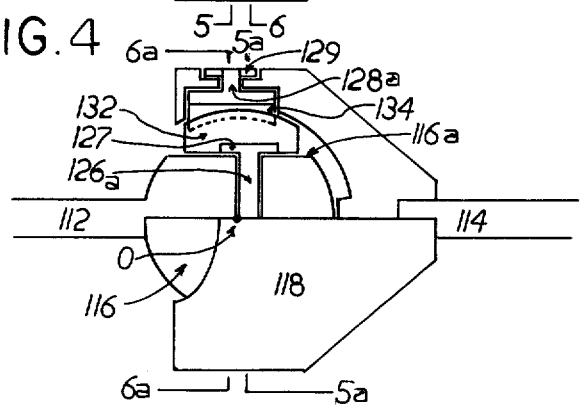
FIG. 4 is a partial section view of another embodiment of this invention.

The Embodiment of FIG. 4

Figure 2:
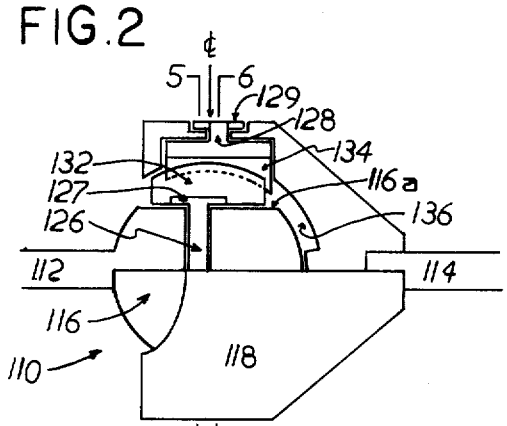
FIG. 2 is a partial section view of another form of universal joint embodying features of this invention.
Figure 3:
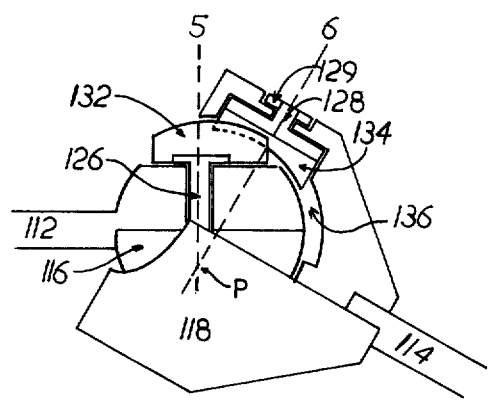
FIG. 3 is another partial section view of the embodiment of FIG. 2 with the input and output shafts at a working angle.

The embodiment of FIG. 4 is virtually identical to that of FIGS. 2 and 3 except that the working shafts are displaced on opposite sides of the center O of the ball and socket joint. Specifically, the input working shaft 126a has its axis along the line 5a, which is displaced a short distance from the center O toward the output shaft. Similarly, the output working shaft 128a is pivoted on axis 6a displaced on the input side of the ball and socket center O.

The Mode of Operation

Figure 7:
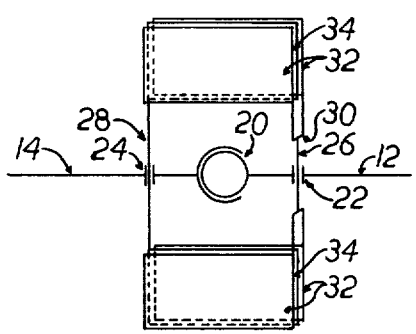
FIGS. 7 through 9 are schematic illustrations of the principles of operation of the universal joint.
Figure 8:
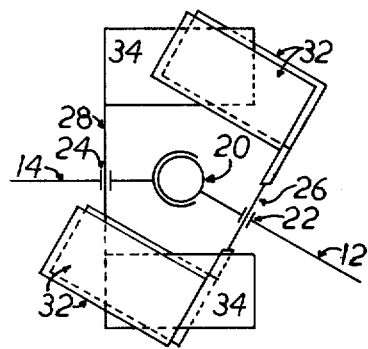
Figure 9:
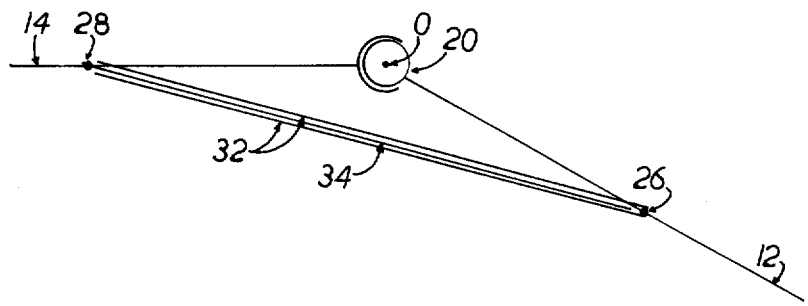

Referring now to FIGS. 7 through 9, the mode of operation of the previously described embodiments are illustrated schematically. In FIG. 7 the input and output shafts 12 and 14 are shown in alignment connected by the ball and socket joint 20. Pivotally carried on the input and output shafts are the motion transmitting shafts 26 and 28 to which are fixed the torque transmitting slide plates 32 and 34, respectively. The same arrangement is shown in FIG. 8 with the input shaft 12 disposed at an angle of approximately 30° to the output shaft 14. With the input and output shafts so disposed, the motion transmitting shafts 26 and 28 on the top are in a diverging relationship with the nested slide plate 34 there tending to separate from the embracing torque transmitting plates 32. On the bottom side, the motion transmitting shafts 26 and 28 are in converging relationship with the intermediate plate 34 sliding further between the embracing torque transmitting plates 32.

It is apparent that, if the input shaft 12 were rotated through 180°, the upper, diverging motion transmitting shafts 26 and 28 would move to the lower converging position and the downwardly extending converging shafts 26 and 28 would move to the upper, diverging position. It is equally apparent that as the input shaft is rotated through 90° of rotation, the motion transmitting shafts 26 and 28 would be parallel to each other and perpendicular to the plane of the paper. This relationship is shown in FIG. 9. As there shown, the intermeshed torque transmitting slide plates 32 and 34 have pivoted from the common plane of the input and output shafts 12 and 14, i.e. the plane of the paper in FIG. 8, to an angle extending between the two motion transmitting shafts in FIG. 9.

A perpendicular from the mid-point of a line intersecting the pivot points of the two working shafts 26 and 28 will always pass through the mid-point O of the ball and socket joint. This will form two right triangles, the corresponding sides and angles of which are equal. The intermeshed motion transmitting slide plates 32 and 34 in effect, constitute a line intersecting the pivot points and, hence, they are disposed at equal angles with both the input and output shafts. The working or motion transmitting shafts 26 and 28 rotate through an equal number of degrees as the slide plates 32 and 34 slide together during rotation of the input and output shafts through 90° to the position shown in FIG. 9, and they will turn through an equal number of degrees as the torque transmitting slide plates reverse their positions through the next 90° rotation of the input shaft 12.

The intermeshed torque transmitting plates 32 and 34 and the working shafts 26 and 28 must be sufficiently rigid to carry the torque load being transmitted without twisting about an axis perpendicular to the working shafts 26 and 28, or about an axis parallel to a line drawn between the intersections of the working shafts with the input and output shafts.

Referring now to FIG. 10, the universal joint 10 of this invention is shown schematically, with the input and output shafts 12 and 14 being connected by a ball and socket joint 20. For purposes of illustration, the input and output motion transmitting shafts are shown schematically as axes CC' and DD', respectively. A theoretical vertical rotation axis AB–A'B', representing the axis in the plane of the paper about which inlet and outlet shafts may pivot, is drawn through the center O of the ball joint. With the inlet and outlet shafts 12 and 14 in alignment as shown in FIG. 10, both of the motion transmitting shafts CC' and DD' are parallel to the vertical rotation axis AA'–BB' in the plane of the paper. In FIG. 11, the input shaft 12 has been turned at an angle to the output shaft 14. In this condition, the input motion transmitting shaft CC' remains parallel to the axis AA' but BB' which is parallel to D–D' is now at an angle to AA', again all in the same plane. The theoretical axis in the plane of the paper about which the axes AA' and BB' can be said to rotate together is represented by the vector axis X–X' which bisects the opposite angles formed by BOA' and AOB'.

The composite vector rotational axis in the plane of the paper about which the working shafts CC' and DD' rotate extends through their mountings on the input and output shafts 12 and 14. This is represented by the axis Y–Y', which extends between the intersections of the working shaft axes CC' and DD' with the input and output shafts 12 and 14, respectively.

Axes X–X' and Y–Y' are both in the common plane of the input and output shafts 12 and 14, i.e. the plane of the paper in FIG. 11. Angles BOA' and A'OB' together equal 180°. As previously described, axis X—X bisects angle BOA'. Similarly a line Z—Z perpendicular to axis Y—Y midway between its intersection with axes DD' and CC' intersect angle A'OB' and, therefore, would be at 90° to the bisector XX of the other angle BOA' making up the 180°. Since, such a line Z—Z is perpendicular to both axes X-X' and Y–Y', such axes, being in the same plane must be parallel.

The parallel relationship of axes X–X' and Y–Y' is illustrated in FIG. 12 in plane θ with the theoretical rotational axes AA' and BB' and the working shaft axes CC' and DD' rotating about the composite vector axes X—X and Y—Y, respectively. Because of the parallel and coplanar relationship between such vector axes, the planes or rotation of AB–A'B' about axis X—X and CD–C'D' about axis Y are coplanar (FIG. 13) or parallel (FIGS. 14 and 15). Accordingly, each degree of rotation of the composite plane AB–A'B' produces the same degrees of rotation of the composite motion transmitting axes CD–C'D' producing a uniform velocity drive through the universal coupling of this invention.

In FIG. 16, the input shaft is disposed at an angle to the output shaft at their ball joint connection 20. Since the motion transmitting axes C and D intersect the input and output shafts 12 and 14 at points equidistant from the center O of the ball joint, a line drawn from the center of the ball joint to the intersection of the working shaft axes C and D forms a common hypotenuse of two adjacent, equal, right triangles. Since angles $\alpha$ and $\beta$ are equal, it is apparent that the drive point P constituting the intersection of a projection of the working axes C and D is always on a line bisecting the working angle of the ball and socket joint 20 and the working arm lengths $g$ and $g'$ are always equal.

Referring now again to FIGS. 8 and 9, the drive point just described moves from its closest proximity to the ball joint in the position of the lower motion transmitting slides 32 and 34 in FIG. 8, to infinity in the parallel relationship at 90° shown in FIG. 9 and then to its closest proximity again at the maximum engagement of the other nested slides at 180°. In the practical embodiment shown in FIGS. 2 and 3, with the working axes 5—5 and 6—6 in close proximity to the center line C.L., it is apparent that with the shafts 14 and 15 disposed at an angle, the intersection of the axes 5—5 and 6—6 will occur close to the axes of the input and output shafts 112 and 114 and that the sliding movement between the nested plates 132 and 134 during a complete revolution will be minimal. In fact as shown the intersection P of the axes occurs within the ball 116.

It is equally apparent that the working axes may be reversed as shown at 5a and 6a in FIG. 4 so that the intersection thereof will occur on the obtuse angle side of the universal joint 110.

While this invention has been described in conjunction with preferred embodiments thereof, it is obvious that modifications and changes therein may be made by those skilled in the art without departing from the spirit and scope of this invention.

What is claimed is:
1. A constant velocity universal joint comprising:
   input and output shafts;
   a ball on one of said shafts and a socket on the other of said shafts, said ball and socket being engaged over sufficient area to insure that they pivot about a constant center point;
   a torque transmitting slide member carried on each of said input and output shafts to pivot about an axis normal to said shaft;
   the pivotal axes of said motion transmitting slide members being in a common plane and equidistantly displaced from said constant center point; and
   said slide members extending along said common plane across said ball and socket joint, and in nested sliding engagement for relative sliding movement along said common plane.

2. The constant velocity universal joint defined by claim 1 including:
   a second pair of interengaged torque transmitting slide members pivotally carried on said input and output shafts about axes equidistantly displaced from said constant center point in a common plane.

3. The constant velocity universal joint defined by claim 1 wherein:
   said slide member pivotal axes are closely spaced about said constant center point.

4. The constant velocity universal joint defined by claim 1 wherein:
   said torque transmitting slide members are pivotally carried on said ball and socket, respectively.

5. The constant velocity universal joint defined by claim 1 wherein:
   there is a first rotational axis in the primary plane common to said input and output shafts; and
   a second rotational axis through the intersections of said pivotal axes with their respective one of said input and output shafts;
   said rotational axes being parallel to each other in said primary plane irrespective of the angle between said input and output shafts;
   whereby planes of rotation about said rotational axes remain parallel or coplanar.

6. The constant velocity universal joint defined by claim 1 wherein:
   said pivotal axes always intersect on a line which bisects one of the angles formed between said input and output shafts irrespective of the sizes of said angles.

* * * * *